US008391362B2

(12) United States Patent
Maruyama et al.

(10) Patent No.: US 8,391,362 B2
(45) Date of Patent: Mar. 5, 2013

(54) MOTION VECTOR ESTIMATION APPARATUS AND MOTION VECTOR ESTIMATION METHOD

(75) Inventors: Yuuki Maruyama, Osaka (JP); Tatsuro Juri, Osaka (JP); Hiroshi Arakawa, Nara (JP); Katsuo Saigo, Hyogo (JP); Koji Arimura, Osaka (JP); Hideyuki Ohgose, Osaka (JP); Kei Tasaka, Nara (JP)

(73) Assignee: Panasonic Corporation, Osaka (JP)

( * ) Notice: Subject to any disclaimer, the term of this patent is extended or adjusted under 35 U.S.C. 154(b) by 1763 days.

(21) Appl. No.: 11/507,530

(22) Filed: Aug. 22, 2006

(65) Prior Publication Data

US 2007/0047652 A1 Mar. 1, 2007

(30) Foreign Application Priority Data

Aug. 23, 2005 (JP) .................................. 2005-241700

(51) Int. Cl.
*H04B 1/66* (2006.01)
*H04N 7/12* (2006.01)
(52) U.S. Cl. ................................ 375/240.16; 348/416.1
(58) Field of Classification Search ........ 375/240.12–240.29; 348/152, 348/153, 154, 155, 416.1, 415.1, 412.1, 411.1, 348/418.1, 417.1, 420.1, 421.1, 422.1; 382/100, 382/103, 107, 164, 168, 232, 236, 238, 170, 382/171, 172, 254
See application file for complete search history.

(56) References Cited

U.S. PATENT DOCUMENTS 5,610,658 A * 3/1997 Uchida et al. .............. 348/416.1
6,208,690 B1 * 3/2001 Tomizawa ................. 375/240.12
6,909,749 B2 * 6/2005 Yang et al. ................ 375/240.16
7,676,101 B2 * 3/2010 Sato et al. ..................... 382/238
7,697,610 B2 * 4/2010 Yu et al. .................... 375/240.16
2002/0136304 A1 * 9/2002 Akhan et al. ............. 375/240.16

(Continued)

FOREIGN PATENT DOCUMENTS

JP 64-069181 3/1989
JP 64-069182 3/1989

(Continued)

OTHER PUBLICATIONS

Yoichi Yagasaki et al., "Jisedai Dogazo Fugoka Hoshiki MPEG4 AVC/H.264 (MPEG-4 AVC/H.264: Next Generation Video Coding Standard)" Mar. 2004, with English translation.

*Primary Examiner* — Behrooz Senfi
(74) *Attorney, Agent, or Firm* — Wenderoth, Lind & Ponack, L.L.P.

(57) ABSTRACT

A motion vector estimation apparatus that can reduce an amount of calculation for video coding processing and thus achieve a higher bit rate and lower consumption power, while contributing to improvement in image quality and coding efficiency include: a reduced picture generation unit which generates a reduced current picture to be coded and a reduced reference picture; a region partition unit which partitions a reduced current picture to be coded into regions and generates reduced region images; a region motion vector estimation unit which estimates a region motion vector of a reduced region image; a confidence level calculation unit which calculates a confidence level of a region motion vector; and a block size narrowing-down unit which narrows down candidate block sizes so as to determine a block size to be used for coding a current block to be coded, based on a region motion vector and a confidence level of the region motion vector.

16 Claims, 10 Drawing Sheets

U.S. PATENT DOCUMENTS

| | | | |
|---|---|---|---|
| 2003/0118101 A1* | 6/2003 | Dinerstein | 375/240.12 |
| 2004/0081238 A1* | 4/2004 | Parhy | 375/240.16 |
| 2004/0258154 A1* | 12/2004 | Liu et al. | 375/240.16 |
| 2005/0013366 A1* | 1/2005 | Gallant et al. | 375/240.16 |
| 2006/0062302 A1* | 3/2006 | Yin et al. | 375/240.16 |
| 2006/0104359 A1* | 5/2006 | Zhou et al. | 375/240.16 |
| 2006/0120452 A1* | 6/2006 | Li | 375/240.16 |

FOREIGN PATENT DOCUMENTS

| | | |
|---|---|---|
| JP | 64-073985 | 3/1989 |
| JP | 2005-167721 | 6/2005 |

\* cited by examiner (a) Reference picture or immediately preceding picture (b) Reduced current picture to be coded (c) Reference picture or immediately preceding picture (d) Reduced current picture to be coded

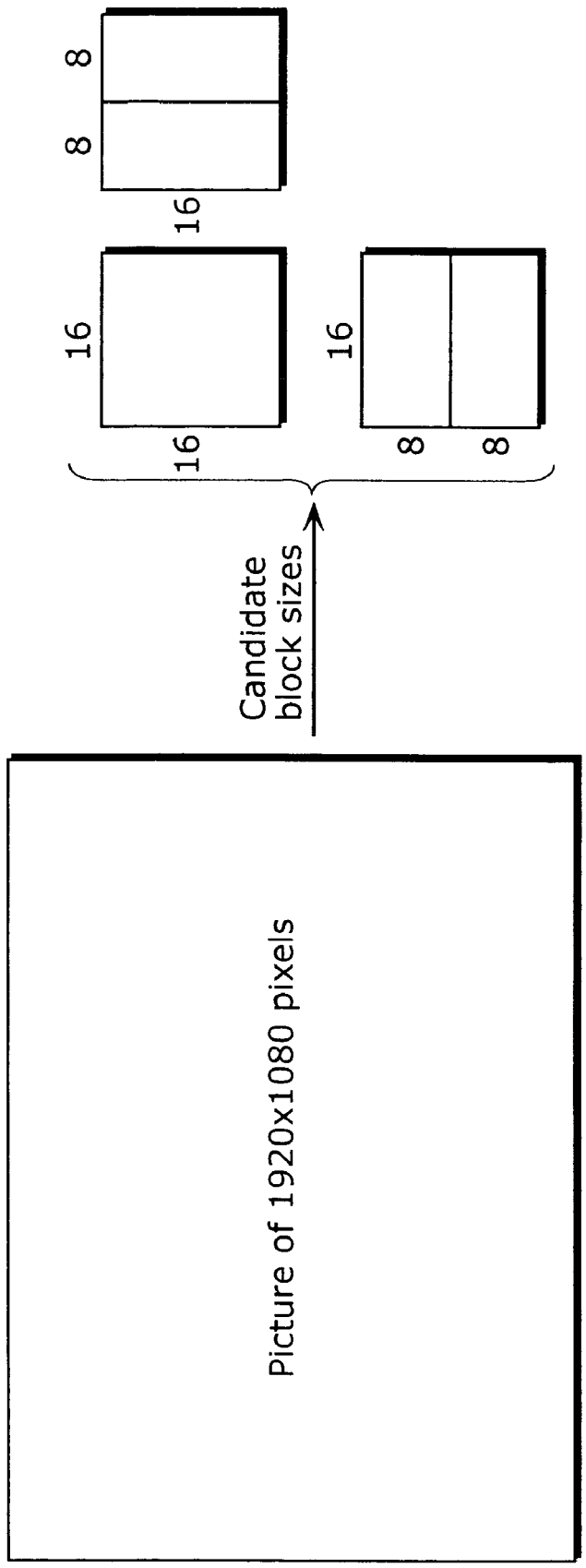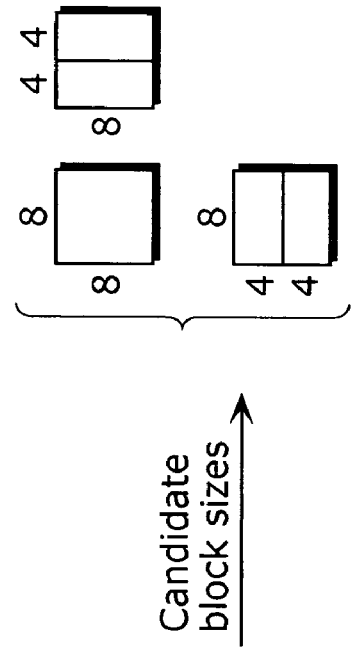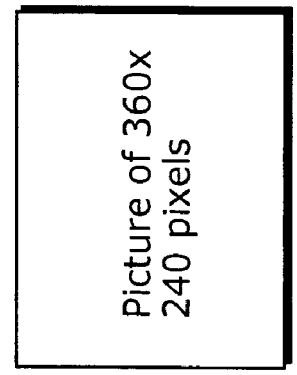
FIG. 7A
FIG. 7B

MOTION VECTOR ESTIMATION APPARATUS AND MOTION VECTOR ESTIMATION METHOD

BACKGROUND OF THE INVENTION (1) Field of the Invention

The present invention relates to a motion vector estimation apparatus for estimating a motion vector of a current block to be coded in a current picture to be coded.

(2) Description of the Related Art

With the advances in semiconductor technology and the like, various coding schemes for video compression have been introduced to home video recorders. In particular, coding schemes such as MPEG-2, MPEG-4 and the like which exploit motion vectors between a number of pictures constituting a video sequence have been widely used.

A motion vector estimation apparatus using such a coding scheme estimates a motion vector between pictures on a block-by-block basis. Particularly, H.264/MPEG-4 AVC gives the encoder the ability to choose which block size, from among a number of block sizes, will be used for the most efficient coding (see, for example, Yoichi Yagasaki, et al., "Jisedai Dogazo Fugoka Hoshiki MPEG4 AVC/H.264 (MPEG-4 AVC/H.264: Next Generation Video Coding Standard)" Mar. 12, 2004). Therefore, differently from the conventional coding scheme using a fixed block size of 16×16 pixels, H.264/MPEG-4 AVC gives flexibility in coding images depending on the properties of the images, and thus better compression ratios can be gained.

As shown in FIG. 1A to FIG. 1D, in H.264/MPEG-4 AVC, each macroblock of 16×16 pixels can be divided into macroblocks of 16×8, 8×16 or 8×8, each of which can have its own motion vector and reference picture. As shown in FIG. 1E to FIG. 1H, each macroblock of 8×8 pixels can further be divided into sub-macroblocks of 8×4, 4×8 or 4×4 pixels.

As mentioned above, when a current picture to be coded is inputted, the conventional motion vector estimation apparatus estimates motion vectors for four types of macroblocks, calculates the prediction errors of predicted images (sum of absolute differences between the original images and the predicted images) predicted based on the reference images and the estimated motion vectors, and selects, as a block size to be used for coding, one of the four types of macroblocks which has the smallest error. Furthermore, if the block size of 8×8 pixels is selected, motion vectors are further estimated for four types of sub-macroblocks, and prediction errors are calculated for these sub-macroblocks. Then, one of the four types of sub-macroblocks which has the smallest error is selected as a block size to be used for coding.

In addition, a motion compensation block size determination method has been proposed in which a block size for motion compensation can be varied depending on edge information included in the image (see, for example, Japanese Laid-Open Patent Application No. 01-69181 Publication). In this motion compensation block size determination method, a picture is divided into small blocks and the number of edges in each small block is obtained. If the number of edges is smaller than a threshold value, these small blocks are combined into larger blocks until the number of edges in each larger block becomes greater than the threshold value, so that that block size is determined to be used for motion compensation.

However, in H.264/MPEG-4 AVC, as described above, since motion vectors are estimated for blocks of different sizes (four candidates as macroblock sizes and four candidates as sub-macroblock sizes) and the optimal block size is selected from among them in order to choose the best prediction method for efficient video coding, there is a problem that a large amount of calculation is required for coding, and thus such coding has a heavy processing load for the calculation and requires a large amount of power.

By the way, image degradation such as a block noise in a scene where there is a large amount of motion between pictures is less noticeable to human eyes than that in a static scene. Therefore, it may be possible to select larger blocks in the scene where image degradation is less noticeable and thus to reduce the amount of coding. However, since the above-mentioned motion compensation block size determination method combines small blocks into larger blocks according to the number of edges in each block, regardless of motion between pictures, smaller blocks are likely to be selected even in the scene where there is a large amount of motion between pictures. Therefore, there is a problem that selection of smaller blocks causes increase in coding amount.

SUMMARY OF THE INVENTION

So the present invention has been conceived in view of the above problems, and has an object to provide a motion vector estimation apparatus and a motion vector estimation method for reducing an amount of calculation for video coding processing and thus achieving a higher bit rate and lower consumption power, while contributing to improving image quality and coding efficiency.

In order to achieve the above object, the motion vector estimation apparatus according to the present invention is a motion vector estimation apparatus which selects, from among candidate block sizes, a block size to be used for coding a current block to be coded in a current picture to be coded, and estimates a motion vector of the current block using the selected block size, and this apparatus includes: a region partition unit which partitions the current picture into at least one region, and generates a region image; a region motion vector estimation unit which estimates a motion vector of the region image generated by the region partition unit, as a region motion vector, using a reference picture used for estimating a motion vector of the current block and the region image; a confidence level calculation unit which calculates a confidence level of the region motion vector, based on a predicted region image and the region image generated by the region partition unit, the predicted region image being generated from the region motion vector estimated by the region motion vector estimation unit and the reference picture; a block size narrowing-down unit which narrows down the candidate block sizes to a candidate block size, in the case where the following conditions are satisfied: the region motion vector estimated by the region motion vector estimation unit is greater than a first threshold value; and the confidence level of the region motion vector calculated by the confidence level calculation unit is higher than a second threshold value; and a motion vector estimation unit which estimates a motion vector of the current block using the candidate block size to which the candidate block sizes have been narrowed down by the block size narrowing-down unit.

Accordingly, processing for determining the optimal block size can be simplified. Therefore, it is possible to reduce an amount of calculation and power required for estimating motion vectors.

Here, the above-mentioned motion vector estimation apparatus may further include a reduced picture generation unit which generates a reduced current picture to be coded by reducing the number of pixels that constitute the current picture, and generates a reduced reference picture by reducing the number of pixels that constitute the reference picture. In this apparatus, the region partition unit may partition, into at least one region, the reduced current picture generated by the reduced picture generation unit, and generate a region image, and the region motion vector estimation unit may estimate a motion vector of the region image, as the region motion vector, based on the reduced reference picture generated by the reduced picture generation unit and the region image generated by the region partition unit. Accordingly, it is possible to reduce an amount of calculation required for estimating region motion vectors.

The above-mentioned reduced picture generation unit may change a reduction ratio of the current picture and the reference picture according to the number of pixels that constitute the current picture. Accordingly, for example, by raising the reduction ratio as the number of pixels constituting a current picture to be coded increases, and by lowering the reduction ratio as the number of pixels decreases, the amount of calculation for estimating motion vectors can be controlled. In addition, by controlling the reduction ratio, it is also possible to realize, for an input video sequence having plural picture sizes and plural frame rate, the best estimation processing for the calculation capability of the motion vector estimation apparatus.

The above-mentioned motion vector estimation apparatus may further include a block size determination unit which estimates motion vectors of the current block in the region image using the candidate block sizes in descending order of size, in the case where at least one of the following conditions is satisfied: the region motion vector estimated by the region motion vector estimation unit is equal to or less than the first threshold value; and the confidence level of the region motion vector calculated by the confidence level calculation unit is equal to or less than the second threshold value, and when a motion vector estimated using one of the candidate block sizes becomes greater than a predetermined threshold value, determines the candidate block size as the block size to be used for coding the current block.

Furthermore, the motion vector estimation apparatus may further include a block size determination unit which estimates motion vectors of the current block using, in descending order of size, the candidate block sizes to which the candidate block sizes have been narrowed down, and when a motion vector estimated using one of the candidate block sizes becomes greater than a predetermined threshold value, determines the candidate block size as the block size to be used for coding the current block.

Accordingly, since the block size to be used for coding is determined when the conditions are satisfied, processing for determining the optimal block size can be simplified. Therefore, it is possible to reduce an amount of calculation and power required for estimating motion vectors.

Note that it is possible to embody the present invention not only as such a motion vector estimation apparatus, but also as a motion vector estimation method including, as steps, the characteristic units of the motion vector estimation apparatus, as well as a program for causing a computer to execute these steps. Furthermore, such a program can be distributed through a recording medium such as a CD-ROM and over a transmission medium such as the Internet.

As further information about technical background to this application, the disclosure of Japanese Patent Application No. 2005-241700 filed on Aug. 23, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 7A and FIG. 7B are diagrams for explaining change in candidate block size according to the number of pixels which constitute a current picture to be coded;

DESCRIPTION OF THE PREFERRED EMBODIMENT(S)

Preferred embodiments of the present invention will hereinafter be described with reference to the drawings.
(First Embodiment)

Figure 1A:
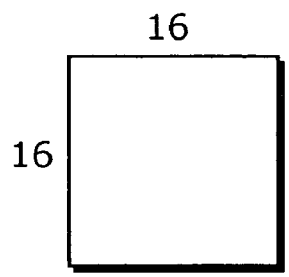
FIG. 1A to FIG. 1H are diagrams for explaining block sizes defined in H.264/MPEG-4 AVC.
Figure 1B:
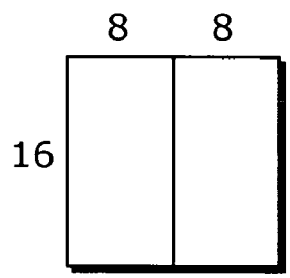
Figure 1C:
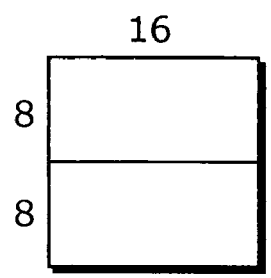
Figure 1D:
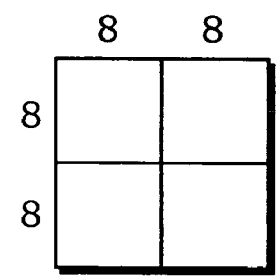
Figure 1E:
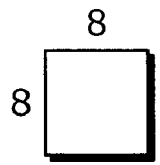
Figure 1F:
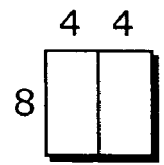
Figure 1G:
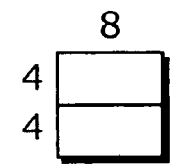
Figure 1H:
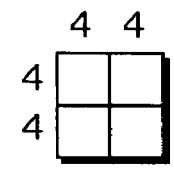
Figure 2:
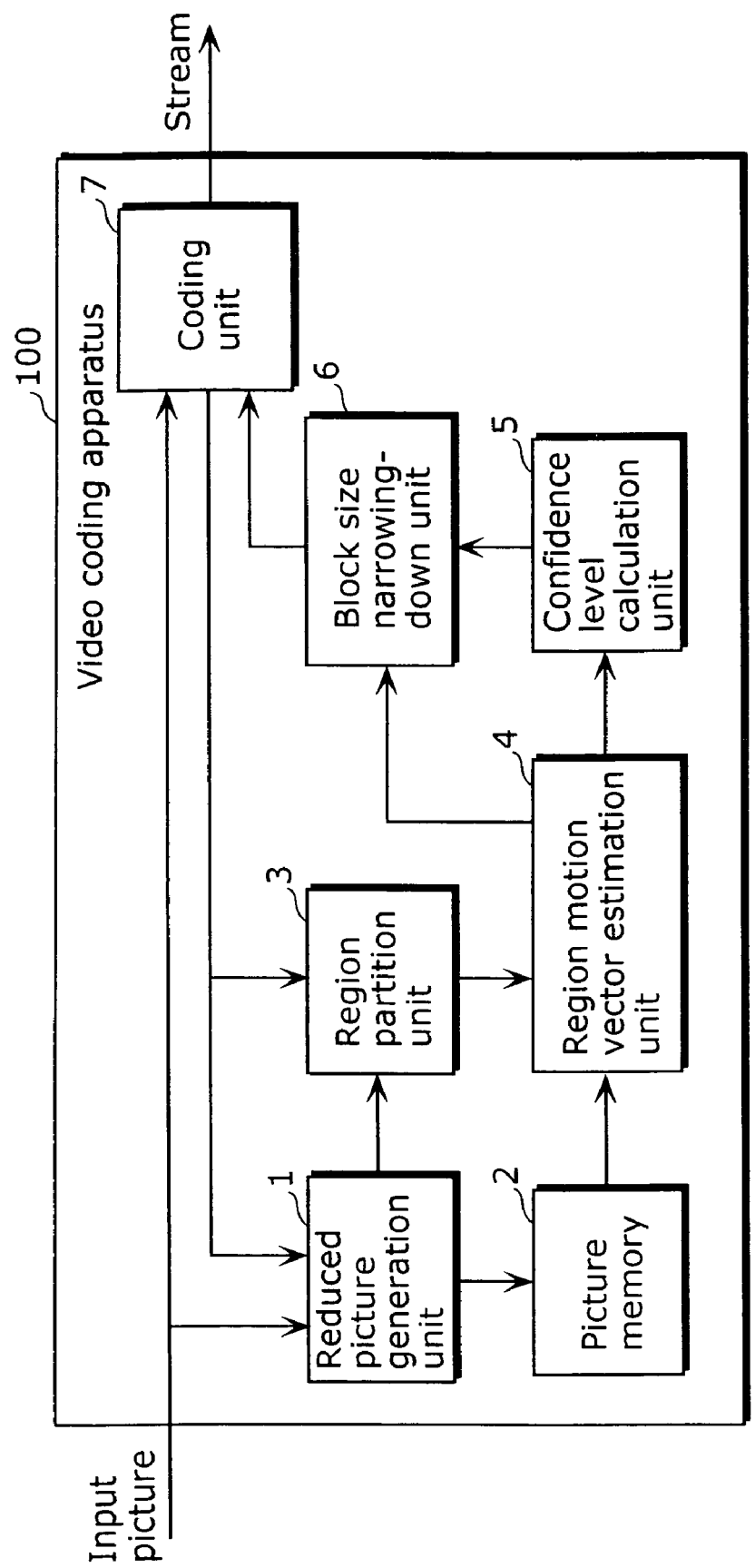
FIG. 2 is a block diagram showing a structure of a video coding apparatus including a motion vector estimation apparatus according to the first embodiment of the present invention.

FIG. 2 is a block diagram showing a structure of a video coding apparatus including a motion vector estimation apparatus according to the first embodiment of the present invention.

A video coding apparatus 100 is an apparatus for coding an input video sequence on a block-by-block basis, and includes, as shown in FIG. 2, a reduced picture generation unit 1, a picture memory 2, a region partition unit 3, a region motion vector estimation unit 4, a confidence level calculation unit 5, a block size narrowing-down unit 6 and a coding unit 7.

The reduced picture generation unit 1 receives a current picture to be coded including a current block to be coded, as well as a reference picture which is referred to for estimation of a motion vector used for coding the current block, performs calculation for reducing the number of pixels of the current picture to generate a reduced current picture to be coded, and performs calculation for reducing the number of pixels of the reference picture to generate a reduced reference picture. Here, a reduced picture is a picture which is reduced in size while maintaining the properties of the images included in the picture.

The reduced reference pictures generated by the reduced picture generation unit 1 are stored into the picture memory 2.

The region partition unit 3 partitions the reduced current picture generated by the reduced picture generation unit 1 into a number of regions, and generates reduced region images.

The region motion vector estimation unit 4 estimates a region motion vector of each reduced region image generated by the region partition unit 3, based on the pixel data which is present in a search region in the reduced reference picture generated by the reduced picture generation unit 1.

A predicted reduced region image is generated from the reduced reference picture generated by the reduced picture generation unit 1 and the region motion vector estimated by the region motion vector estimation unit 4. Then, the confidence level calculation unit 5 calculates the confidence level of each region motion vector, based on the predicted reduced region image and the reduced region image generated by the region partition unit 3.

The block size narrowing-down unit 6 narrows down the candidate block sizes based on each region motion vector estimated by the region motion vector estimation unit 4 and the confidence level of each region motion vector calculated by the confidence level calculation unit 5.

Figure 3:
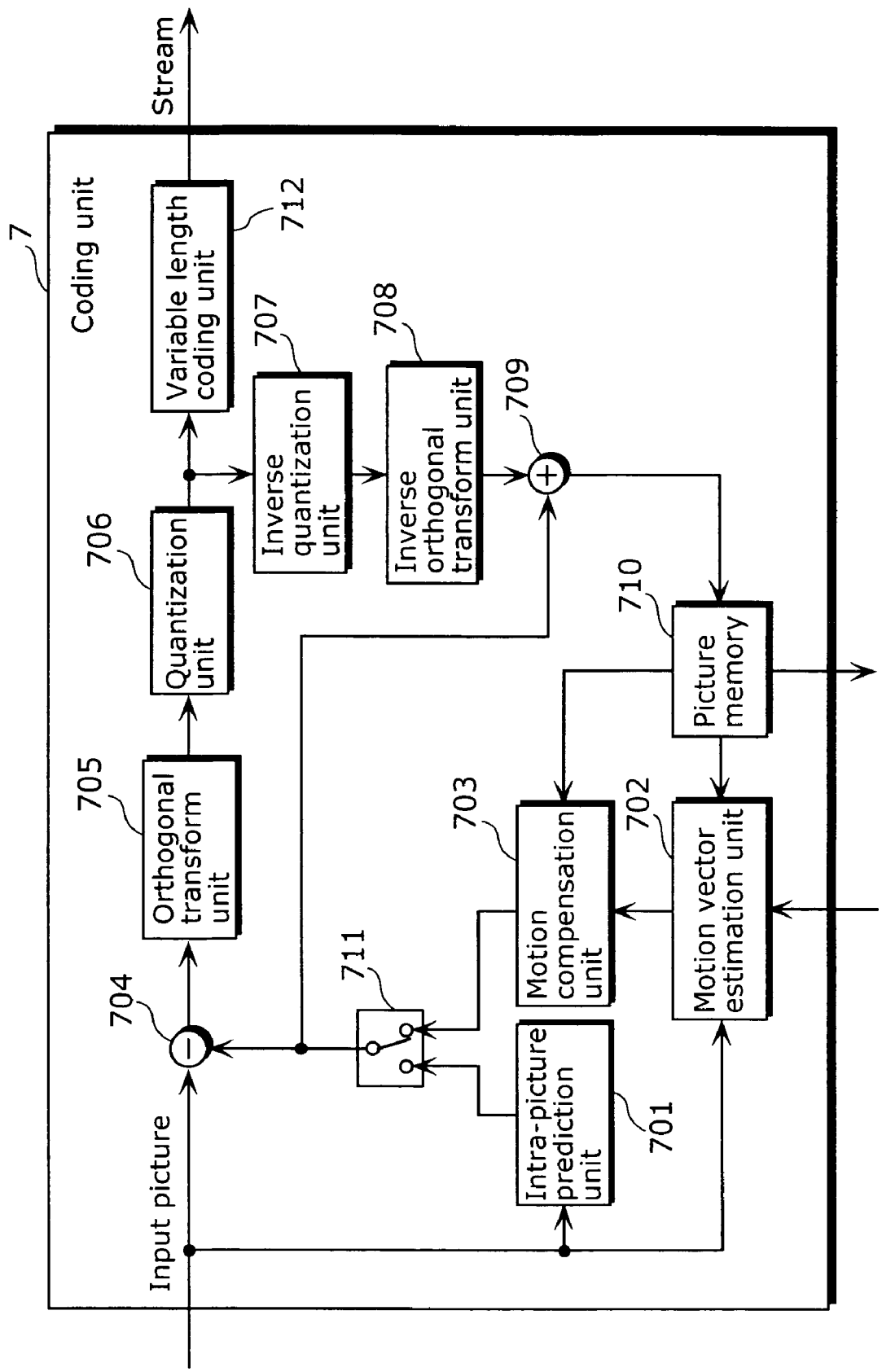
FIG. 3 is a block diagram showing a structure of a coding unit of the video coding apparatus of the first embodiment.

FIG. 3 is a block diagram showing the structure of the coding unit 7 of the video coding apparatus 100.

The coding unit 7 includes an intra-picture prediction unit 701, a motion vector estimation unit 702, a motion compensation unit 703, a difference calculation unit 704, an orthogonal transform unit 705, a quantization unit 706, an inverse quantization unit 707, an inverse orthogonal transform unit 708, an addition unit 709, a picture memory 710, a switch 711 and a variable length coding unit 712.

The input picture is inputted to the intra-picture prediction unit 701, the motion vector estimation unit 702 and the difference calculation unit 704. The motion vector estimation unit 702 searches a decoded picture stored in the picture memory 710, per region of each candidate block size to which the candidate block sizes have been narrowed down by the block size narrowing-down unit 6, finds an image region which is most similar to the input picture from among the regions so as to determine the motion vector indicating the location of the most similar image region, and determines the block size having the smallest difference as a block size to be used for coding, as well as the motion vector of the block of that size. The motion compensation unit 703 extracts the optimal image region for prediction, as a predicted picture, from the decoded pictures stored in the picture memory 710, using the motion vectors estimated by the motion vector estimation unit 702 so as to generate a predicted picture. The intra-picture prediction unit 701 performs intra-picture prediction using the coded pixels within the same picture so as to generate a predicted picture. The switch 711 switches between intra-picture prediction and inter-picture prediction.

On the other hand, when receiving the input picture, the difference calculation unit 704 calculates the difference value between the input picture and the predicted picture, and outputs this difference value to the orthogonal transform unit 705. The orthogonal transform unit 705 transforms the difference value into frequency coefficients and outputs the resulting coefficients to the quantization unit 706. The quantization unit 706 quantizes the inputted frequency coefficients and outputs the resulting quantized values to the variable length coding unit 712.

The inverse quantization unit 707 inversely quantizes the inputted quantized values so as to reconstruct them to frequency coefficients, and outputs the resulting coefficients to the inverse orthogonal transform unit 708. The inverse orthogonal transform unit 708 inversely frequency transforms the frequency coefficients into differential pixel values, and outputs the resulting values to the addition unit 709. The addition unit 709 adds the differential pixel values to the pixel values of the predicted picture outputted from the intra-picture prediction unit 701 or the motion compensation unit 703 so as to obtain a decoded picture. The variable length coding unit 111 performs variable length coding of the quantized values, the motion vectors and the like, and outputs a stream.

Next, the operations of the video coding apparatus 100 including the motion vector estimation apparatus structured as mentioned above will be described.

Figure 4:
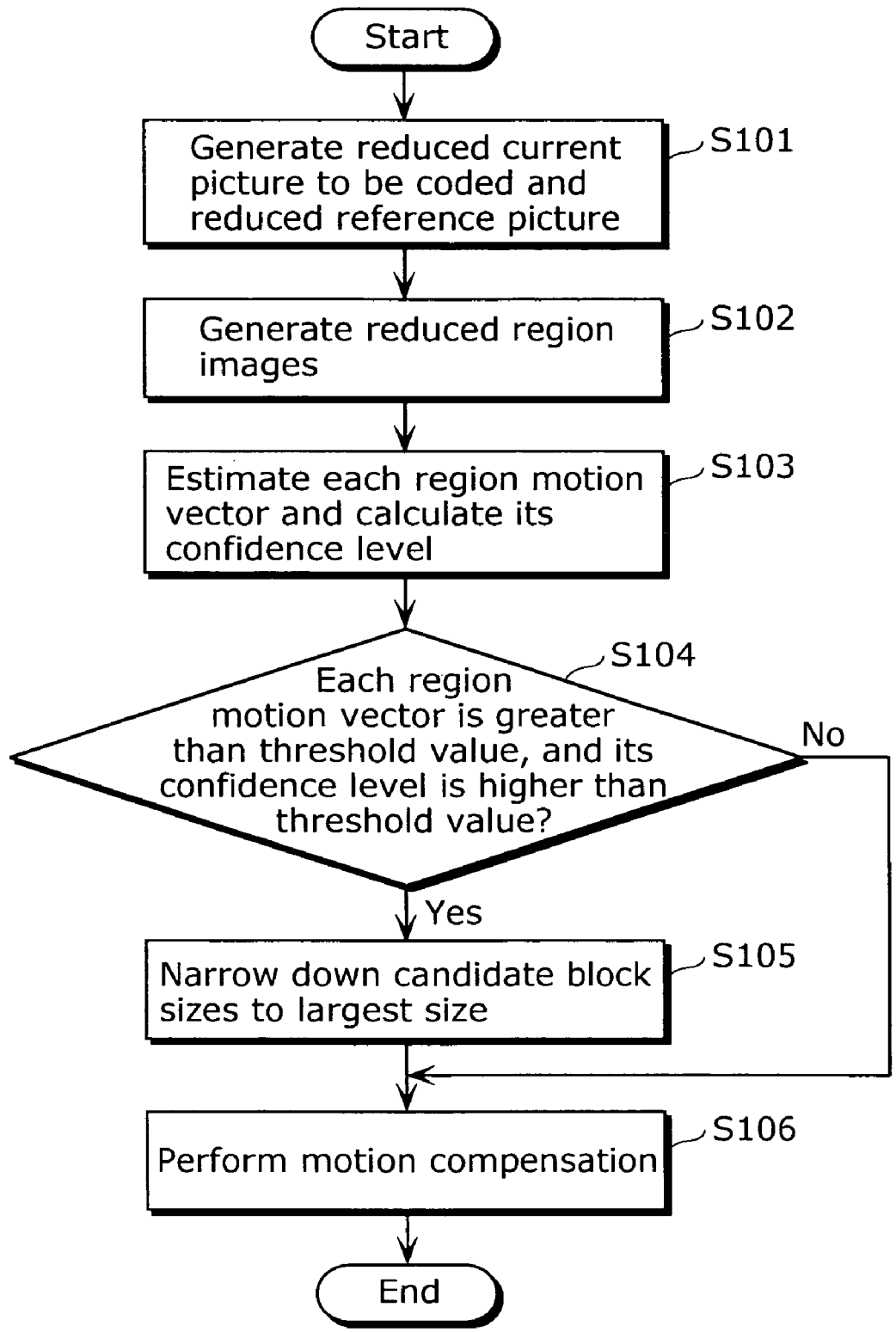
FIG. 4 is a flowchart showing an operation sequence of the motion vector estimation apparatus of the first embodiment when estimating motion vectors.

FIG. 4 is a flowchart showing the operation sequence when a motion vector is estimated.

First, the reduced picture generation unit 1 receives a current picture to be coded. The current picture to be coded consists of, for example, 1920×1080 pixels. The current picture includes a current block to be coded. The current block to be coded consists of, for example, 16×16 pixels.

The reduced picture generation unit 1 receives a reference picture which has been locally decoded by the coding unit 7. The locally-decoded reference picture consists of, for example, 1920×1080 pixels. The reduced picture generation unit 1 is equipped with a filter which attenuates vertical or horizontal high frequency components of the current picture to be coded and the locally-decoded reference picture. The reduced picture generation unit 1 reduces the number of pixels that constitute the current picture and the reference picture which have been attenuated in their high frequency components by the filter, and generates a reduced current picture to be coded and a reduced reference picture (Step S101). Then, the reduced reference picture generated by the reduced picture generation unit 1 is stored into the picture memory 2.

Figure 5A:
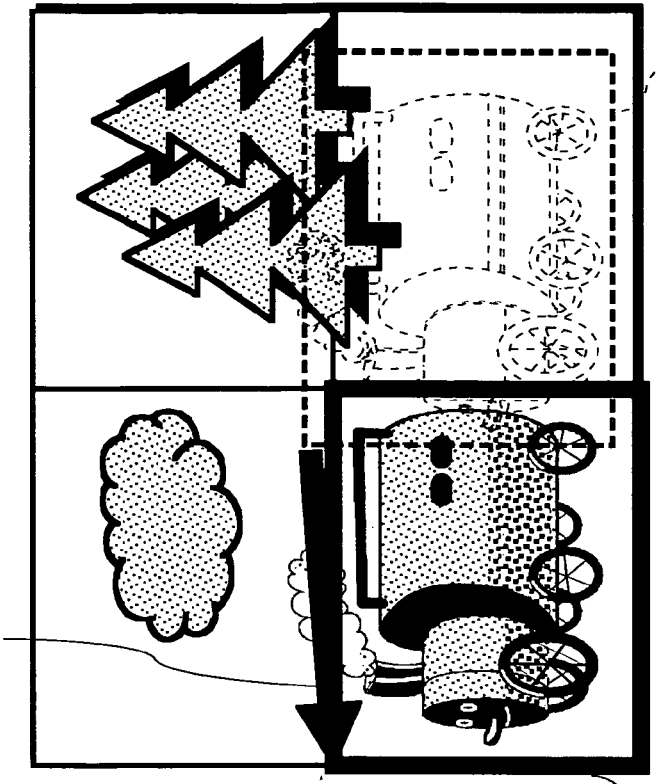
FIG. 5A and FIG. 5B are diagrams for explaining examples of region partition and estimation of a region motion vector in the motion vector estimation apparatus of the first embodiment.
Figure 5B:
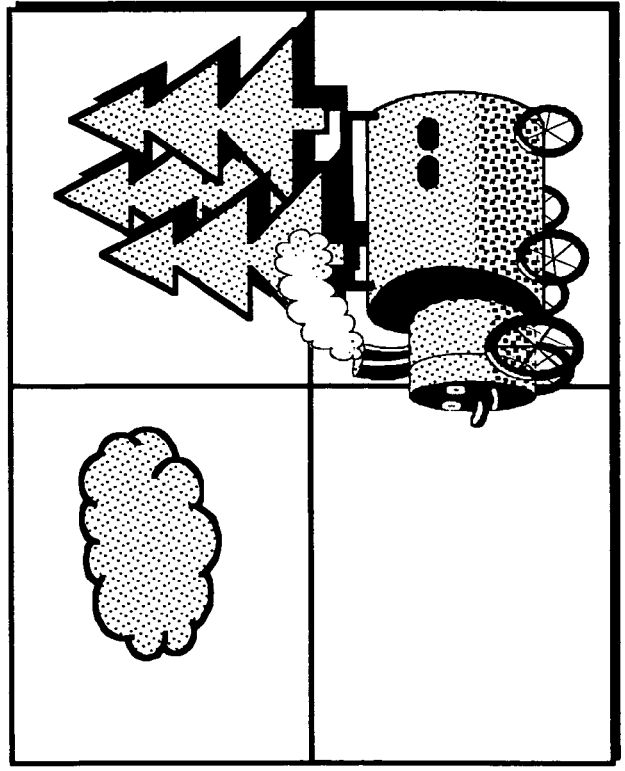
Figure 6A:
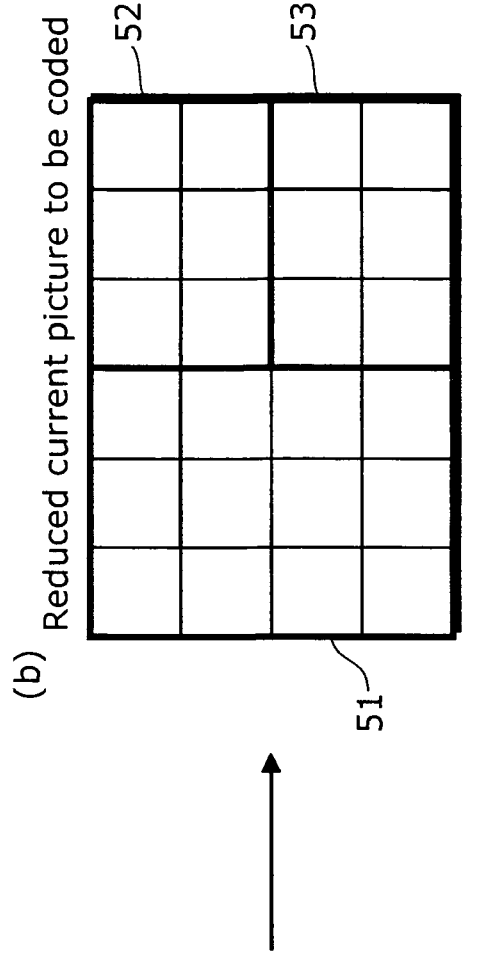
FIG. 6A and FIG. 6B are diagrams for explaining examples of how a region partition unit of the motion vector estimation apparatus of the first embodiment partitions a picture into regions.
Figure 6A:
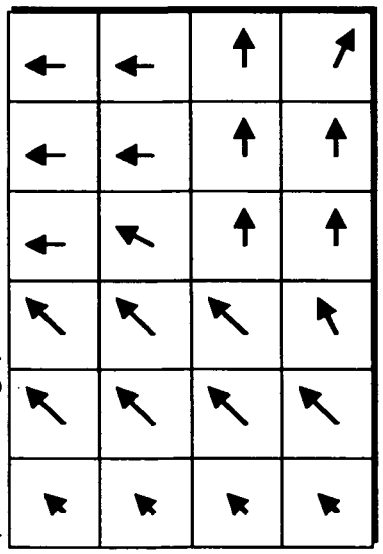
Figure 6B:
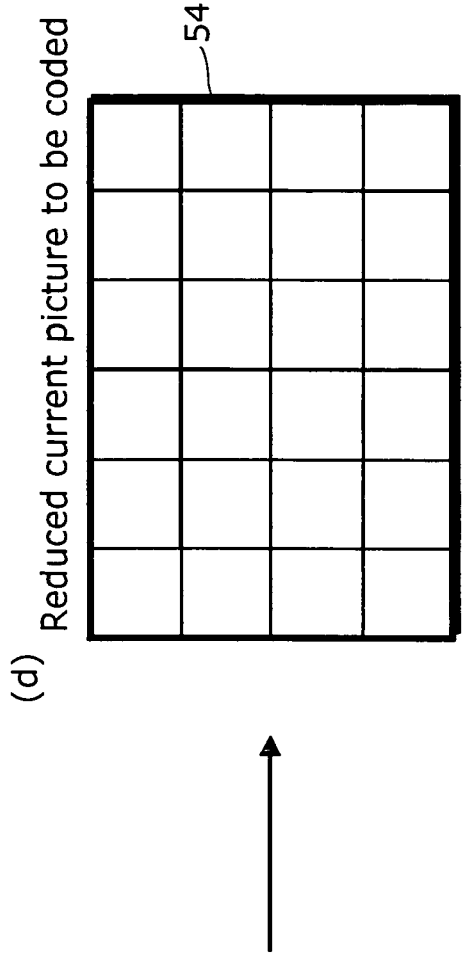
Figure 6B:
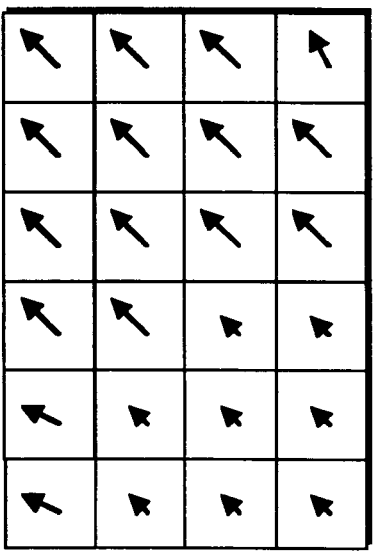

Next, the region partition unit 3 partitions the reduced current picture generated by the reduced picture generation unit 1 into a number of (four in the case of FIG. 5B) regions of a predetermined size as shown in FIG. 5B, and generates reduced region images (Step S102). Note that a reduced current picture may be partitioned into regions of a fixed size, or may be partitioned into regions of various sizes determined based on the information such as the motion vectors of its reference picture or immediately preceding picture. FIG. 6A and FIG. 6B are schematic diagrams showing the examples of how to partition a reduced current picture into regions based on the motion vectors of its reference picture or immediately preceding picture. Here, FIG. 6A(*a*) and FIG. 6B(*c*) each show motion vectors of respective macroblocks in a reference picture or an immediately preceding picture, while FIG. 6A(*b*) and FIG. 6B(*d*) each show determined region partition in a reduced current picture to be coded. For example, the region partition of the reduced current picture is determined so that each region corresponds to a group of combined adjacent macroblocks having motion vectors which point in the similar directions within a predetermined range. To be more specific, in the case where respective macroblocks in the reference picture or the immediately preceding picture have the motion vectors as shown in FIG. 6A(*a*), the region partition of the reduced current picture is determined, as shown in FIG. 6A(*b*), so as to have three regions 51, 52 and 53. In the case where respective macroblocks in the reference picture or the immediately preceding picture have the motion vectors as shown in FIG. 6B(*c*), the region partition of the reduced current picture is determined, as shown in FIG. 6B(*d*), so as to have only one region 54. Note that as shown in FIG. 6B, a reduced current picture may be partitioned into one region.

Next, the region motion vector estimation unit 4 searches each region of the reduced reference picture, as shown in, for example, FIG. 5A, generated by the reduced picture generation unit 1, finds the image region (for example, a image region 42 as shown in FIG. 5B) which is most similar to the reduced region image (for example, a reduced region image 41 as shown in FIG. 5B) from among the search regions, and determines the motion vector (for example, a motion vector 43 as shown in FIG. 5B) indicating the location of that image region so as to determine the region motion vector (Step S103). Here, the image region which is most similar to the reduced region image is, for example, an image region having the smallest sum of absolute differences (SAD), from among the SADs between pixel values of respective image regions in the search regions included in a reduced reference picture and pixel values of the reduced region image.

Next, the confidence level calculation unit 5 calculates the confidence level between each reduced region image included in the reduced reference picture detected by the region motion vector estimation unit 4 and the image region which is most similar to the reduced region image, and determines this level to be the confidence level of each region motion vector (Step S103). Note that this confidence level may be calculated based on the sum of absolute differences, or the variance or covariance.

Next, the block size narrowing-down unit 6 judges whether or not each region motion vector estimated by the region motion vector estimation unit 4 is greater than a predetermined threshold value and each confidence level of the region motion vector calculated by the confidence level calculation unit 5 is higher than a predetermined threshold value (Step S104). As a result, when the region motion vector is greater than the predetermined threshold value and the confidence level of the region motion vector is higher than the predetermined value (Yes in Step S104), the block size narrowing-down unit 6 narrows down the candidate block sizes to the largest size (Step S105). On the contrary, when the region motion vector is not greater than the predetermined threshold value or the confidence level of the region motion vector is not higher than the predetermined value (No in Step S104), the block size narrowing-down unit 6 does not narrow down the candidate block sizes for coding. As for candidate block sizes for coding, all the sizes defined in H.264/MPEG-4 AVC can be the candidates. Or, candidate block sizes may be changed depending on the number of pixels constituting a current picture to be coded. For example, if an input picture consists of 1920×1080 pixels as shown in FIG. 7A, blocks of 16×16, 16×8 and 8×16 can be the candidates. And if an input picture consists of 320×240 pixels as shown in FIG. 7B, blocks of 8×8, 8×4 and 4×8 pixels can be the candidates.

Next, the motion vector estimation unit 702 of the coding unit 7 estimates a motion vector, per block of the largest size to which the candidate block sizes have been narrowed down by the block size narrowing-down unit 6, included in a current block to be coded within the region of the current picture corresponding to the reduced region image (Step S106). Note that in the present embodiment, the block size narrowing-down unit 6 narrows down the candidate block sizes to the largest size, but the present invention is not limited to this narrowing-down. For example, the block size narrowing-down unit 6 may narrow down the candidate block sizes to the largest and second largest sizes. In this case, the motion vector estimation unit 702 can estimate a motion vector, for each of the blocks of all the narrowed-down sizes, included in a current block to be coded within the region of the current picture corresponding to the reduced region image, and selects the most efficient block size from among them so as to estimate the motion vector of the block of that size.

After that, the coding unit 7 performs a series of processes such as motion compensation, orthogonal transform, quantization, variable length coding and the like, using the estimated motion vectors.

As described above, in the present embodiment, candidate block sizes are narrowed down for coding based on the region motion vectors estimated by the region motion vector estimation unit 4 and the confidence levels of the region motion vectors calculated by the confidence level calculation unit 5. And, since the narrowing-down of block sizes eventually leads to determination of a block size to be used for coding, processing for determining the optimal block size can be omitted. Therefore, it is possible to reduce an amount of calculation and power required for estimating motion vectors.

By choosing which block size will be used for the most efficient coding, from among a number of block sizes, it is possible to reduce image degradation such as mosquito noise. However, since the use of smaller blocks increases information such as motion vectors, the number of bits for coding also increases. According to the motion vector estimation apparatus of the present embodiment, since the largest block size is selected from among candidate block sizes by exploiting the property that image degradation such as a block noise in a scene where there is a large amount of motion between pictures is less noticeable to human eyes than that in a static scene, it is possible to reduce the number of bits required for coding while minimizing visual image degradation.

Since the filter equipped in the reduced picture generation unit 1 attenuates the vertical or horizontal high frequency components of a current picture to be coded and a reference picture, it is possible not only to reduce the effect of noise when motion vectors are estimated but also to reduce the effect of aliasing when the number of pixels decreases by picture reduction. Therefore, the accuracy of motion vector estimation can be enhanced.

Note that the reduced picture generation unit 1 may change the reduction ratio of a current picture to be coded and a reference picture depending on the number of pixels constituting the current picture. For example, by raising the reduction ratio as the number of pixels constituting a current picture to be coded increases, and by lowering the reduction ratio as the number of pixels decreases, the amount of calculation for estimating motion vectors can be controlled. By controlling the reduction ratio, it is also possible to realize, for an input video sequence including plural pictures of different sizes or different frame rates, the best estimation processing for the calculation capability of the motion vector estimation apparatus.

In the first embodiment, the region motion vector estimation unit 4 estimates each region motion vector of a reduced region image using a reduced reference picture generated by the reduced picture generation unit 1, but the present invention is not limited to such estimation. For example, the region motion vector may be the mean value of the motion vectors of the regions of the reference picture, each corresponding to each reduced region image.

Figure 8:
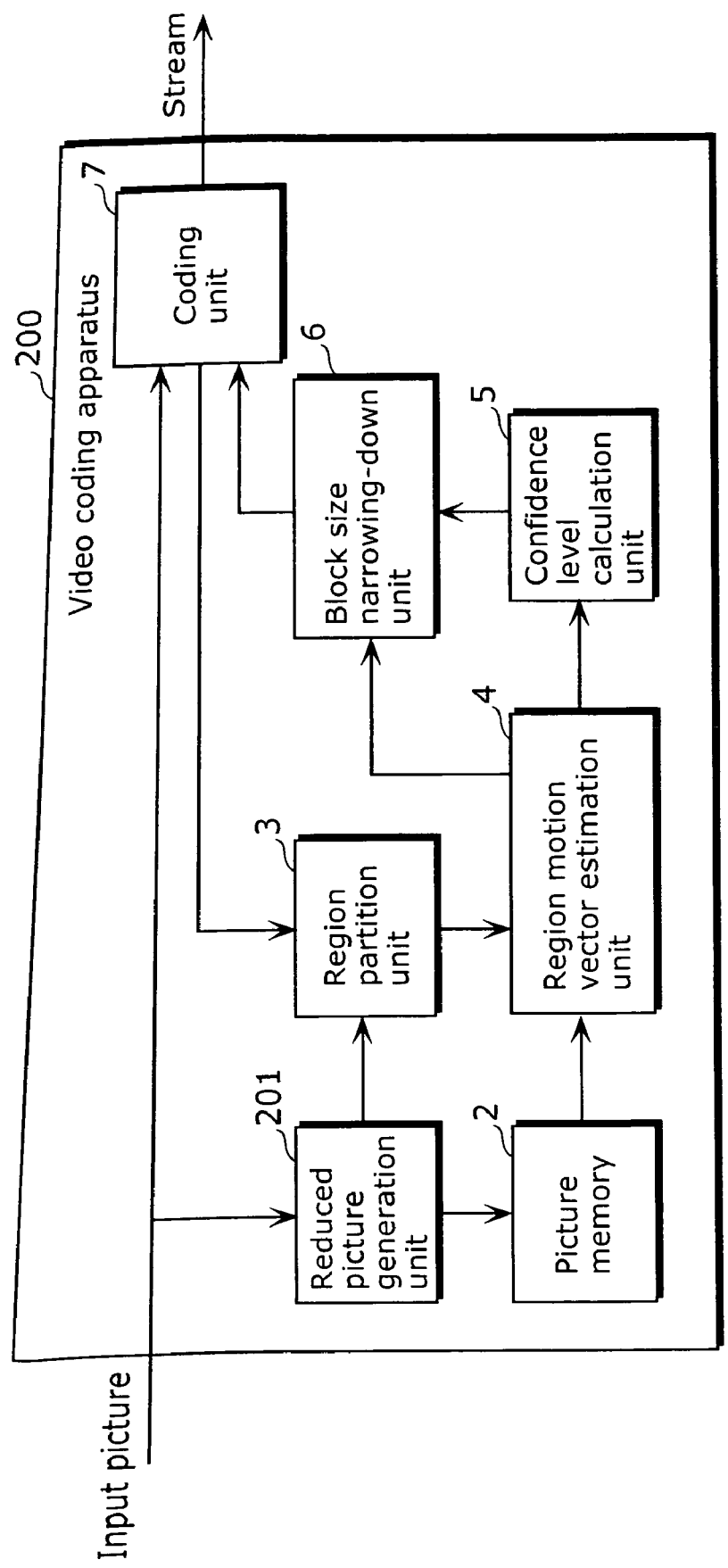
FIG. 8 is a block diagram showing another structure of the video coding apparatus including the motion vector estimation apparatus according to the first embodiment of the present invention.

The first embodiment shows an example where the region motion vector estimation unit 4 uses a reference picture which has been locally decoded by the coding unit 7, but the present invention is not limited to such a case. For example, as shown in FIG. 8, the region motion vector estimation unit 4 may estimate region motion vectors based on a reduced reference picture obtained by reducing the size of an input picture.

As described above, the motion vector estimation apparatus of the present invention narrows down the candidate block sizes to be used for motion vector estimation based on the region motion vectors of regions in a picture and their confidence levels, and the processes for estimating motion vectors are reduced. Therefore, motion vector estimation can be speeded up.

(Second Embodiment)

Figure 9:
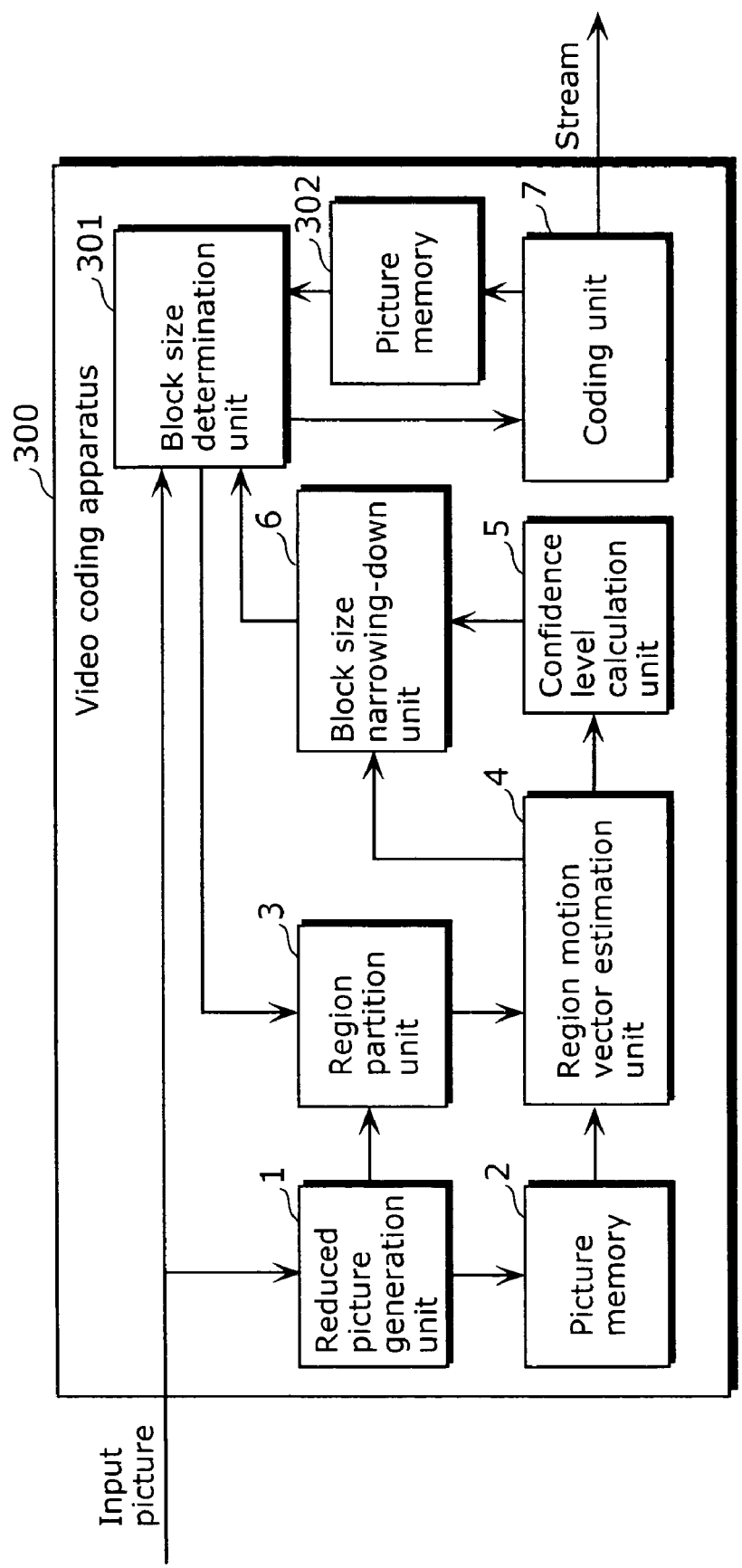
FIG. 9 is a block diagram showing a structure of a video coding apparatus including a motion vector estimation apparatus according to the second embodiment of the present invention.

FIG. 9 is a block diagram showing a structure of a video coding apparatus including a motion vector estimation apparatus according to the second embodiment of the present invention. Note that the same reference numbers are assigned to the same constituent elements as those of the video coding apparatus 100 in the first embodiment as described with reference to FIG. 2. Therefore, a detailed description of these constituent elements is not repeated here.

A video coding apparatus 300 includes a block size determination unit 301 and a picture memory 302 as shown in FIG. 9, in addition to the constituent elements of the video coding apparatus 100.

In the case where as a result of the judgment of the block size narrowing-down unit 6 whether or not each region motion vector is greater than the predetermined threshold value and the confidence level of the region motion vector is higher than the predetermined threshold value, no region motion vector satisfy these conditions, the block size determination unit 301 estimates motion vectors using the candidate block sizes in descending order of size, and if a motion vector estimated in a block size is greater than a predetermined threshold value, the block size determination unit 301 determines this block size as a block size to be used for coding.

Next, the operations of the video coding apparatus 300 including the motion vector estimation apparatus structured as mentioned above will be described.

Figure 10:
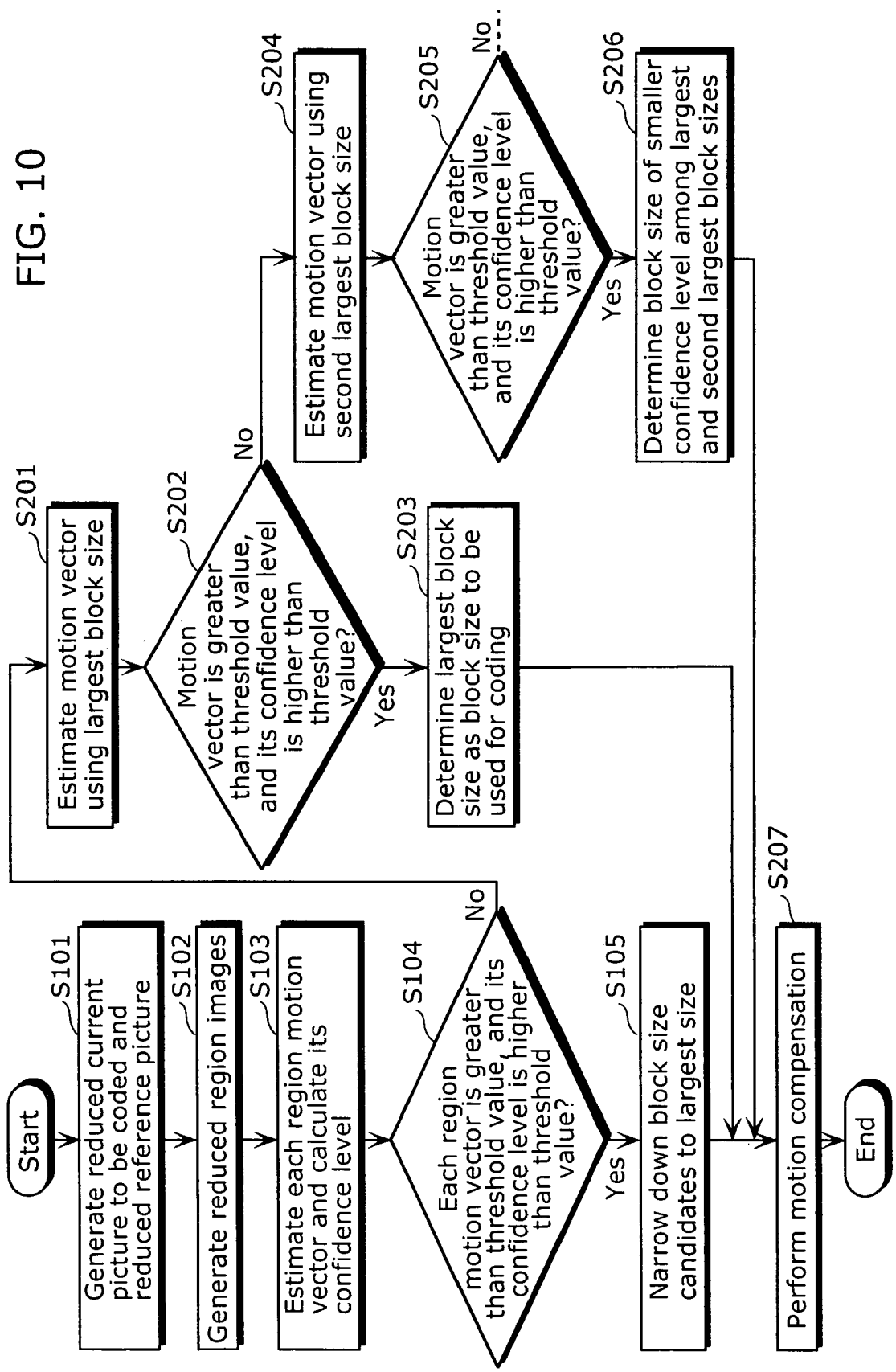
FIG. 10 is a flowchart showing an operation sequence of the motion vector estimation apparatus of the second embodiment when estimating motion vectors.

FIG. 10 is a flowchart showing the operation sequence when a motion vector is estimated. Note that since the operation sequence from generation of a reduced current picture to be coded and a reduced reference picture (Step S101) up to narrowing-down of candidate block sizes by the block size narrowing-down unit 6 (Step S105) is same as that of the above first embodiment, a description thereof is not repeated here.

When the region motion vector is not greater than the predetermined threshold value or the confidence level of the region motion vector is not higher than the predetermined value (No in Step S104) as a result of the judgment by the block size narrowing-down unit 6 (Step S104), the block size determination unit 301 estimates a motion vector of the block of the largest size among the candidate block sizes (Step S201). Then, the block size determination unit 301 judges whether or not the estimated motion vector is greater than a predetermined threshold value and the confidence level of the motion vector is higher than a predetermined threshold value (Step S202). As a result, when the motion vector is greater than the predetermined threshold value and the confidence level of the motion vector is higher than the predetermined value (Yes in Step S202), the block size determination unit 301 determines the largest size among the candidate block sizes, as a block size to be used for coding (Step S203).

On the other hand, when the motion vector is not greater than the predetermined threshold value or the confidence level of the motion vector is not higher than the predetermined value (No in Step S202), the block size determination unit 301 estimates a motion vector of the block of the second largest size among the candidate block sizes (Step S204). Then, the block size determination unit 301 judges whether or not the estimated motion vector is greater than a predetermined threshold value and the confidence level of the motion vector is higher than a predetermined threshold value (Step S205). As a result, when the motion vector is greater than the predetermined threshold value and the confidence level of the motion vector is higher than the predetermined value (Yes in Step S205), the block size determination unit 301 determines the block size of the highest confidence level, among the largest and second largest block sizes, as a block size to be used for coding (Step S206). When the motion vector is not greater than the predetermined threshold value or the confidence level of the motion vector is not higher than the predetermined value (No in Step S205), the block size determination unit 301 estimates a motion vector of the block of the third largest size among the candidate block sizes, and in this way, the block size determination unit 301 estimates motion vectors in sequence.

Next, the motion vector estimation unit 702 of the coding unit 7 estimates motion vectors using the block size to which the candidate block sizes have been narrowed down by the block size narrowing-down unit 6, namely the largest block size, or the block size determined by the block size determination unit 301 (Step S207). Note that when the region motion vector is not greater than the predetermined threshold value or the confidence level of the region motion vector is not higher than the predetermined value (No in Step S104) as a result of the judgment by the block size narrowing-down unit 6 (Step S104), the motion vector estimation unit 702 does not need to estimate a motion vector again because the block size determination unit 301 has estimated the motion vector.

After that, the coding unit 7 performs a series of processes such as motion compensation, orthogonal transform, quantization, variable length coding and the like, using the estimated motion vectors.

As described above, in the present embodiment, the block size determination unit 301 estimates in sequence motion vectors using candidate block sizes for coding in descending order of size, and determines the block size when the motion vector satisfies the above conditions. Therefore, processing for determining the optimal block size can be simplified. Therefore, it is possible to reduce an amount of calculation and power required for estimating motion vectors.

Note that in the case where two or more estimated motion vectors of blocks of same size and different shapes are greater than the predetermined threshold value, the block size of, for example, the highest confidence level among the confidence levels used for obtaining the motion vectors, is determined to be the block size to be used for coding a current block.

It is also possible for the block size determination unit 301 to perform the above-mentioned processing on a reduced number of candidate block sizes to which the candidate block sizes have been narrowed down by the block size narrowing-down unit 6 so as to determine a block size to be used for coding.

Each of the above embodiments can be applied to either luma components or chroma components of pixel data of a current picture to be coded.

Each functional block in the block diagrams shown in FIG. 2, FIG. 8 and FIG. 9 is realized as an LSI which is typically an integrated circuit. This LSI can be integrated into one chip, or also can be integrated into plural chips. For example, functional blocks other than a memory may be integrated into one chip. The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSI or a reconfigurable processor that allows reconfiguration of the connection or setup of circuit cells inside the LSI can be used for the same purpose.

In the future, with advancement in semiconductor technology or another technology derived therefrom, a brand-new integration technology may replace LSI. The integration can be carried out by that technology. Application of biotechnology is one such possibility.

Only a unit for storing data out of the functional blocks may be structured as a separate unit, not integrated into one chip.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

Since the above-described motion vector estimation apparatus according to the present invention allows video coding in H.264 format with less calculation processing load, it can be applied not only to a personal computer, an HDD recorder and a DVD recorder but also to a video camera, a camera cellular phone and so forth. The present invention can also be applied to a coding apparatus equipped with this motion vector estimation apparatus.

What is claimed is:

1. A motion vector estimation apparatus which selects, from among a predetermined number of n candidate block sizes where n is an integer of 2 or greater, a block size to be used for coding a current block to be coded in a current picture to be coded, and estimates a motion vector of the current block using the selected block size, said apparatus comprising:
    an obtaining unit operable to obtain a motion amount indicating an amount of motion of the current block in a reference picture;
    a block size narrowing-down unit operable to narrow down the n candidate block sizes for use in estimating a motion vector to m candidate block sizes in a case where the motion amount obtained by said obtaining unit is greater than a first predetermined threshold value, where m is (i) an integer greater than or equal to 1 and (ii) an integer smaller than n; and
    a motion vector estimation unit operable to estimate the motion vector of the current block using the m candidate block sizes to which the n candidate block sizes have been narrowed down by said block size narrowing-down unit,
    wherein said block size narrowing-down unit narrows down the n candidate block sizes to the m candidate block sizes according to a descending order of size of the n candidate block sizes so that the m candidate block sizes include the m largest candidate block sizes from among the n candidate block sizes.

2. The motion vector estimation apparatus according to claim 1,
    wherein said obtaining unit is operable to obtain a region motion vector as the motion amount, and
    wherein said motion vector estimation apparatus further comprises:
        a reduced picture generation unit operable to generate a reduced current picture to be coded by reducing the number of pixels that constitute the current picture, and to generate a reduced reference picture by reducing the number of pixels that constitute the reference picture;
        a region partition unit operable to partition, into at least one region, the reduced current picture generated by said reduced picture generation unit, and to generate a region image; and
        a region motion vector estimation unit operable to estimate a motion vector of the region image, as the region motion vector, based on the reduced reference picture generated by said reduced picture generation unit and the region image generated by said region partition unit.

3. The motion vector estimation apparatus according to claim 2,
    wherein said reduced picture generation unit is operable to change a reduction ratio of the current picture and the reference picture according to the number of pixels that constitute the current picture.

4. The motion vector estimation apparatus according to claim 2,
    wherein said reduced picture generation unit is operable to generate the reduced reference picture from an input picture that corresponds to the reference picture.

5. The motion vector estimation apparatus according to claim 2,
    wherein said region partition unit is operable to partition the current picture into two or more regions of a predetermined size.

6. The motion vector estimation apparatus according to claim 2,
    wherein said region partition unit is operable to partition the current picture into the at least one region based on a motion vector of a picture which immediately precedes the reference picture or the current picture.

7. The motion vector estimation apparatus according to claim 6,
    wherein said region partition unit is operable to partition the current picture into a variable number of the regions based on the motion vector of the picture which immediately precedes the reference picture or the current picture.

8. The motion vector estimation apparatus according to claim 6,
    wherein said region partition unit is operable to partition the current picture into the regions of a variable size based on the motion vector of the picture which immediately precedes the reference picture or the current picture.

9. The motion vector estimation apparatus according to claim 1,
    wherein said block size narrowing-down unit is operable to change the candidate block sizes according to the number of pixels that constitute the current picture.

10. The motion vector estimation apparatus according to claim 2, further comprising
    a confidence level calculation unit operable to calculate a confidence level of the region motion vector based on a predicted region image and the region image generated by said region partition unit, the predicted region image being generated from the region motion vector estimated by said region motion vector estimation unit and the reference picture,
    wherein said block size narrowing-down unit is operable to narrow down the n candidate block sizes only to a largest candidate block size, in a case where the following conditions are satisfied: the region motion vector is greater than a first threshold value; and the confidence level of the region motion vector is higher than a second threshold value.

11. The motion vector estimation apparatus according to claim 10, further comprising
a block size determination unit operable to (i) estimate motion vectors of the current block in the region image using the n candidate block sizes in descending order of size, in a case where at least one of the following conditions is satisfied: the region motion vector estimated by said region motion vector estimation unit is equal to or less than the first threshold value; and the confidence level of the region motion vector calculated by said confidence level calculation unit is equal to or less than the second threshold value, and (ii) when a motion vector estimated using one of the n candidate block sizes becomes greater than a second predetermined threshold value, determine the one of the n candidate block sizes as the block size to be used for coding the current block.

12. The motion vector estimation apparatus according to claim 11,
wherein when motion vectors estimated using candidate block sizes which are different in shape but identical in size become greater than the second predetermined threshold value, said block size determination unit is operable to determine one of the n candidate block sizes, which has been used to estimate a motion vector of a highest confidence level among the estimated motion vectors, as the block size to be used for coding the current block.

13. The motion vector estimation apparatus according to claim 1, further comprising
a block size determination unit operable to (i) estimate motion vectors of the current block using, in descending order of size, the m candidate block sizes to which the n candidate block sizes have been narrowed down by said block size narrowing-down unit, and (ii) when a motion vector estimated using one of the m candidate block sizes becomes greater than a second predetermined threshold value, determine the one of the m candidate block sizes as the block size to be used for coding the current block.

14. A motion vector estimation method of selecting, from among a predetermined number of n candidate block sizes where n is an integer of 2 or greater, a block size to be used for coding a current block to be coded in a current picture to be coded, and estimating a motion vector of the current block using the selected block size, said method comprising:
obtaining a motion amount indicating an amount of motion of the current block in a reference picture;
narrowing down the n candidate block sizes for use in estimating a motion vector to m candidate block sizes in a case where the motion amount obtained in said obtaining is greater than a predetermined threshold value, where m is (i) an integer greater than or equal to 1 and (ii) an integer smaller than n; and
estimating the motion vector of the current block using the m candidate block sizes to which the n candidate block sizes have been narrowed down in said narrowing-down,
wherein said narrowing down narrows down the n candidate block sizes to the m candidate block sizes according to a descending order of size of the n candidate block sizes so that the m candidate block sizes include the m largest candidate block sizes from among the n candidate block sizes.

15. An integrated circuit for selecting, from among a predetermined number of n candidate block sizes where n is an integer of 2 or greater, a block size to be used for coding a current block to be coded in a current picture to be coded, and estimating a motion vector of the current block using the selected block size, said circuit comprising:
an obtaining unit operable to obtain a motion amount indicating an amount of motion of the current block in a reference picture;
a block size narrowing-down unit operable to narrow down the n candidate block sizes for use in estimating a motion vector to m candidate block sizes in a case where the motion amount obtained by said obtaining unit is greater than a predetermined threshold value, where m is (i) an integer greater than or equal to 1 and (ii) an integer smaller than n; and
a motion vector estimation unit operable to estimate the motion vector of the current block using the m candidate block sizes to which the n candidate block sizes have been narrowed down by said block size narrowing-down unit,
wherein said block size narrowing-down unit narrows down the n candidate block sizes to the m candidate block sizes according to a descending order of size of the n candidate block sizes so that the m candidate block sizes include the m largest candidate block sizes from among the n candidate block sizes.

16. The motion vector estimation apparatus according to claim 1,
wherein said motion vector estimation unit is operable to estimate, as the motion vector of the current block, a motion vector of a block having a size at which coding efficiency is highest among motion vectors estimated using the m candidate block sizes.

* * * * *